Oct. 6, 1964
C. V. EVERETT ETAL
3,151,433
BEET TOPPER
Filed Jan. 2, 1962
2 Sheets-Sheet 1
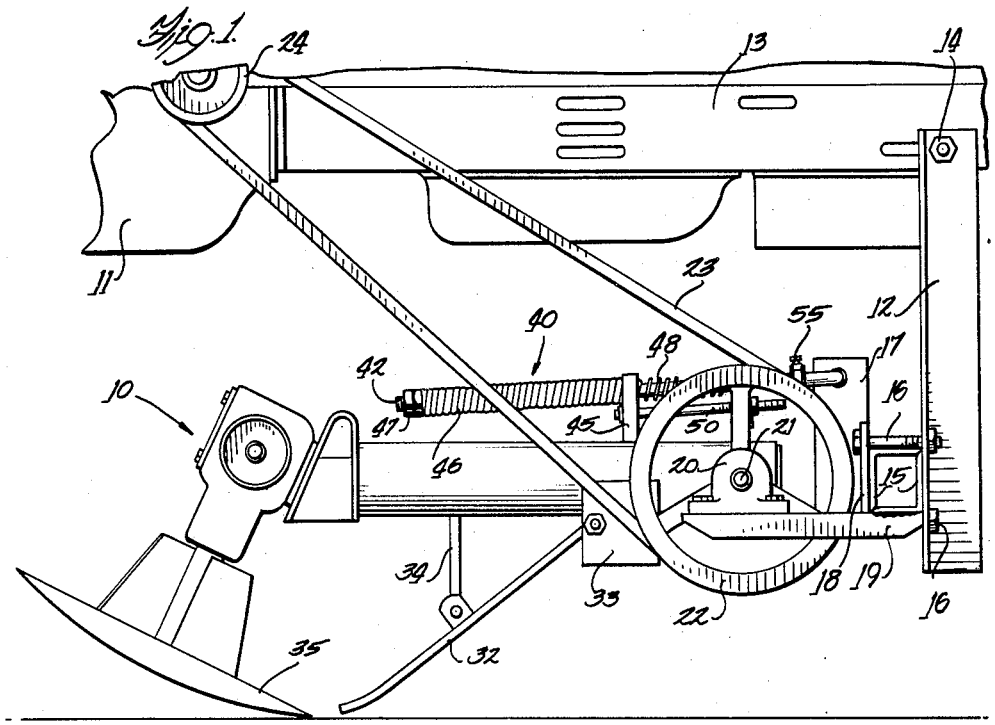
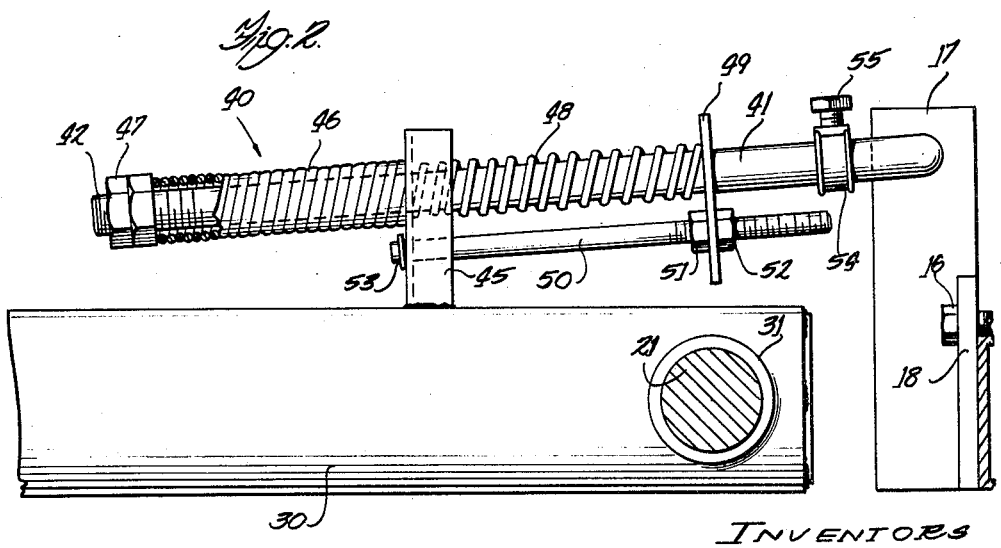
INVENTORS
CHARLES V. EVERETT
EVERETT M. CLARK
Paul O. Pippel
ATTORNEY Oct. 6, 1964   C. V. EVERETT ETAL   3,151,433
BEET TOPPER
Filed Jan. 2, 1962   2 Sheets-Sheet 2
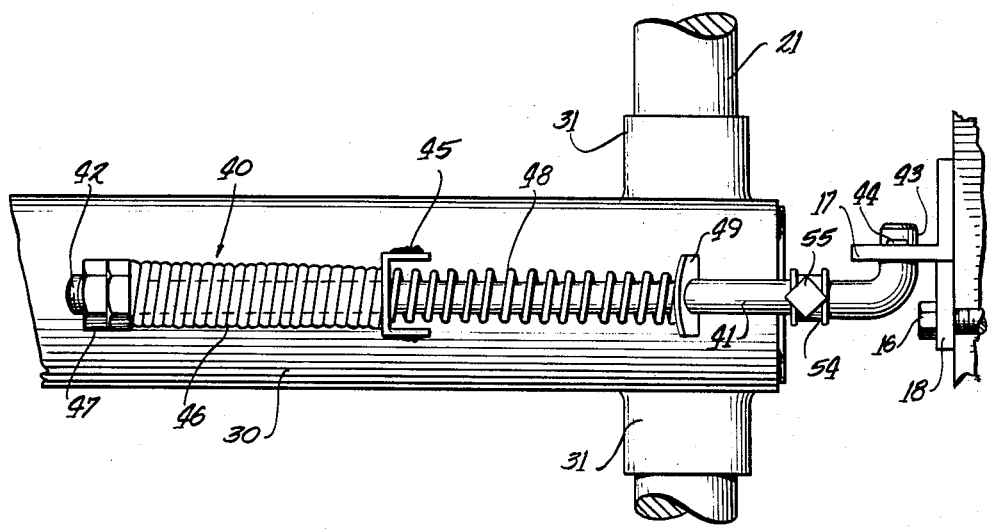
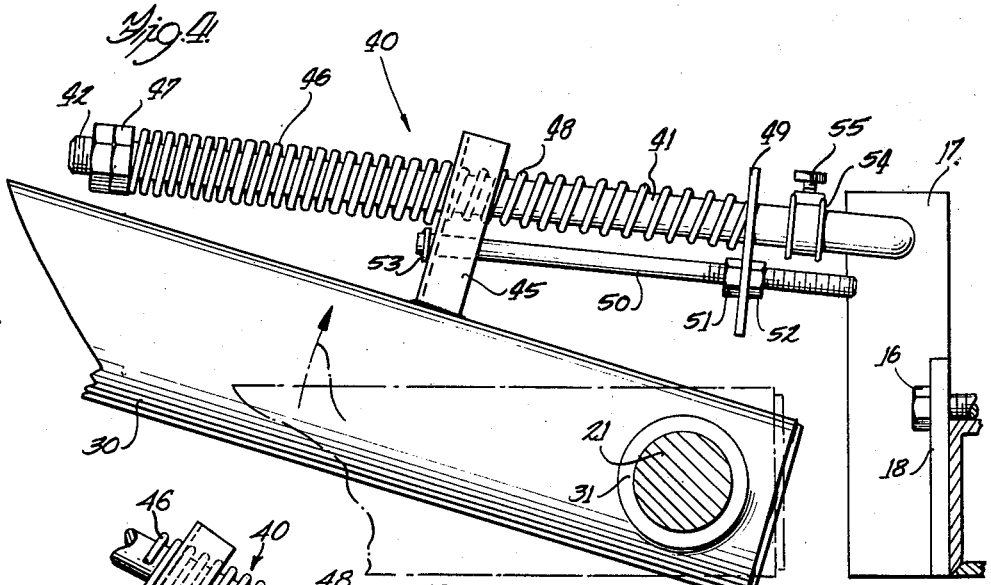
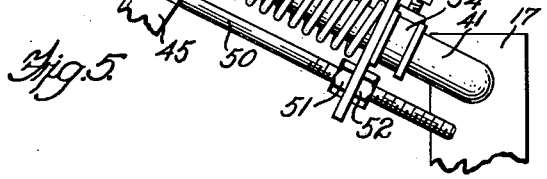
INVENTORS
CHARLES V. EVERETT
EVERETT M. CLARK
Paul O. Pippel
ATTORNEY

United States Patent Office 3,151,433
Patented Oct. 6, 1964

3,151,433
BEET TOPPER
Charles V. Everett, Warrenville, and Everett M. Clark, Naperville, Ill., assignors to International Harvester Company, Chicago, Ill., a corporation of New Jersey
Filed Jan. 2, 1962, Ser. No. 163,470
3 Claims. (Cl. 56—121.46)

This invention relates generally to agricultural implements and more particularly to an improved topping device for a beet harvester.

In the beet harvester field, it is well known to provide a topping device with a finder, which positions the topping unit with respect to each beet, and with a rotating disk that cuts off the top of the beet and its associated foliage. The exposed body of the beet is then lifted from the ground, cleaned, and conveyed to a trailing cart. While such devices have in general served the purpose, difficulty has been encountered in obtaining uniform topping, particularly when harvesting at higher tractor speeds. Since the beet crowns usualliy vary considerably in height above the ground, it is desirable to mount the topping unit in such a way as to allow it to swing freely to different positions, to compensate for the different sizes of beets which may be encountered. However, when a tractor is operated at a relatively high speed with a freely swingable topping unit, it has been discovered that the topping unit exhibits a tendency to bounce over the beet crowns causing a different amount to be removed from each successive plant. To obviate this problem, the present invention contemplates the use of a novel arrangement which allows the topping unit to bounce or swing upwardly a certain predetermined amount, and which then resiliently urges the topping unit into re-engagement with each successive beet.

Another problem which has been encountered in known beet topping devices, is that often the finder will exert too great a force upon the beet, causing the beet to be damaged or even overturned in moist or sandy soil. To overcome this problem, the present invention proposes to provide a beet topper with means which allow a predetermined amount of pressure to be exerted upon each beet.

An object of the present invention is to provide adjustable resilient means which support the weight of the topping unit, thereby allowing a selective amount of pressure to be exerted upon each beet.

Another object of the invention is to provide means for resiliently counter-acting upward bounce or movement of the topping unit, to allow the the topping unit to remove a uniform amount from each beet.

A further object of the invention is the provision of means for controlling the movement of the topping unit throughout the wide range of conditions which may be encountered.

Other objects and advantages of the invention will hereinafter become more fully apparent from the following description of the annexed drawings, which illustrate a preferred embodiment of the invention, and wherein:

FIGURE 1 is a side elevational view of a topping unit embodying the present invention;

FIGURE 2 is a side elevational view similar to FIGURE 1, but on an enlarged scale and with certain parts broken away for clarity;

FIGURE 3 is a plan view of the apparatus shown in FIGURE 2;

FIGURE 4 is a view similar to FIGURE 2 showing the position of the topping unit elements when the unit has bounced to an elevated position, and FIGURE 5 is a fragmentary view similar to FIGURE 4, but on a reduced scale showing the topping unit elements in a further position.

Referring now to the drawings, wherein like reference characters designate like or corresponding parts throughout the several views, there is shown in FIGURE 1 a beet topping unit 10 employing a preferred embodiment of the present invention. Topping unit 10 is secured to a tractor 11 by a pair of mounting angle members 12, which are adjustably secured to the tractor channels 13 by bolts 14 or the like. A beam, consisting of a pair of boxed angles 15, extends transversely across the tractor and is secured to members 12 by bolts 16. A plurality of spaced-apart brackets having generally vertically extending portions 17, and flange portions 18 disposed substantially at right angles to portions 17, are secured to beam 15 by having bolts 16 pass through flange 18. Although only one bracket 17 is shown in the drawings, a plurality are usually provided, depending upon the number of topping units that are to be employed in the beet harvester.

A plurality of fore and aft extending shelves 19 are fixedly secured to beam 15 at spaced-apart points therealong, and have bearing blocks 20 mounted thereon. A transversely extending shaft 21 is mounted for rotation in bearing blocks 20. A driven pulley 22 is mounted upon shaft 21, and is driven by an endless belt 23, which is trained over a driving pulley 24 secured to the tractor drive shaft. Power take-off means, forming no part of the present invention and not shown in the drawings, are associated with shaft 21 for rotation of the topping disks.

Each of the plurality of topping units of the beet harvester are substantially identical, so that a description of one unit will be sufficient to point out the novel features of the present invention. Each topping unit includes a supporting member in the form of a pipe 30 which extends in a fore and aft direction of tractor 11, and is provided with a pair of arms 31 extending substantially at right angles to the axis of pipe 30. Shaft 21 is rotatably journaled in arms 31, and pipe 30 is free to pivot in a vertical direction about shaft 21.

Finder unit 32 is secured in depending relation to pipe 30 by bracket 33 and rod 34. A rotatable topping disk 35 is mounted on pipe 30 adjacent the finder unit 32. As the beet harvester traverses a field, the finder unit 32 slides over the crown of the beet plant, pivoting pipe 30 around shaft 21, thereby disposing topping disk 35 in proper cutting relation to each beet plant.

To insure the uniform topping of the beets when the tractor is traversing a field at a relatively high speed, and to permit the finder to have a selective amount of pressure on the beet tops, a stabilizing unit 40 is provided for each of the beet topping units. Stabilizing unit 40 includes a fore and aft extending rod 41 having a threaded end portion 42, and an end portion 43 extending substantially at right angles to the axis of the rod. As best seen in FIGURE 3, end portion 43 is mounted for pivoting movement in bracet 17, and contains an opening for reception of a cotter pin 44, to lock it in position. A bracket 45, having upper and lower apertures, is fixedly secured to an intermediate portion of pipe 30. Rod 41 is mounted for sliding movement in the upper aperture of bracket 45.

A coil spring 46 surrounds rod 41, and abuts against bracket 45. The tension in spring 46 may be adjusted by regulator means in the form of the double nut 47 which is provided on threaded end 42 of rod 41. It will be readily apparent that as pipe 30 is swung vertically downward about shaft 21, brackets 45 will compress spring 46 against nut 47, causing spring 46 to support the weight of the topping unit. The height of topping disk 35 relative to the ground may be regulated by threading nut 47 along rod portion 42.

A second coil spring 48 is provided on rod 41, and abuts against bracket 45 at one end, and against a retainer and regulator plate 49 at the other end. Retainer plate 49 is slidable along rod 41 to regulate the tension in spring 48.

Means for varying the extent of upward movement of the topping unit before spring 48 becomes effective include a second rod 50 extending substantially parallel to rod 41. One end of rod 50 extends through the lower aperture of bracket 45, and the other end of rod 50 is threaded for reception of nuts 51 and 52. The adjustment of the tension of spring 48 is effected by merely loosening nuts 51 and 52, and then moving retainer plate 49 to the desired position along rod 41, and tightening nuts 51 and 52 to lock retainer plate 49 in this position. Nuts 51 and 52 may be adjusted to compress spring 48 to such an extent that it will cooperate with spring 46 to support the weight of the topping unit. Stop means 53 are provided on the end of rod 50 extending through the lower aperture of bracket 45 to prevent rod 50 from sliding completely through bracket 45.

A collar or control means 54 is slidably mounted on rod 41 and is selectively lockable in a desired position by a set screw 55. The position of collar 54 controls the amount of free upward movement of the topping unit before spring 48 takes effect, as will hereinafter become more apparent.

Operation of stabilizing unit 40 will be best understood from an examination of FIGURE 2, FIGURE 4, and FIGURE 5. In FIGURE 2, a topping unit is shown with pipe 30 in a substantially horizontal plane, which will dispose topping disk 35 at the proper predetermined position to cut the desired amount off the average height beet. When finder unit 32 engages a beet that is raised higher or lower than the other beets in the field, or when it engages any other obstruction, the entire topping unit will be swung vertically upward or downward around shaft 21. For example in FIGURE 4 the topping unit is shown in an elevated position, having encountered a raised beet or obstruction. It will be noted that with the parts in this position, retainer plate 49 has not yet contacted collar 54, and therefore spring 48 has not yet begun to resist the upward movement of the topping unit. When the parts are in the position illustrated in FIGURE 5, it will be noted that the retainer plate is engaging collar 54, and that spring 48 has been compressed by bracket 45. The compression of spring 48, in combination with the weight of the topping unit, will resist the upward swinging movement of the unit and will force the topping unit back into the position illustrated in FIGURE 2, where the normal topping operation will be resumed.

It should be understood, of course, that the foregoing disclosure relates to only a preferred embodiment of the invention and that numerous modifications or alterations may be made therein without departing from the spirit and the scope of the invention as set forth in the appended claims.

What is claimed is:

1. In combination with a beet topper or the like having a frame adapted to be connected to a tractor, at least one supporting member mounted on said frame for swinging movement in a vertical plane, said supporting member having a beet topping disk depending therefrom, a finder element mounted on said supporting member adjacent said topping disk and adapted to engage a beet crown with a selective amount of pressure to swing said supporting member about said frame and align said topping disk with respect to said beet crowns, a stabilizing unit for each supporting member comprising a rod mounted on said frame for swinging movement in the plane of said supporting member, a bracket fixedly secured to said supporting member and slidably receiving said rod, first and second coil spring members surrounding said rod in abutting relation to said bracket, regulator means engageable with said spring members to force them against said bracket and control the compression of said spring members, one of said regulator means being slidably mounted on said rod, and control means on said rod spaced from said slidable regulator means when said supporting member is in the initial unswung position and engageable with said slidable regulator means after a predetermined upward swinging movement of said topping unit.

2. In combination with a beet topping unit or the like having a frame adapted to be connected to a tractor, at least one supporting member mounted for vertical swinging movement with respect to said frame, said supporting member having a beet top removing mechanism mounted thereon, a stabilizing unit for said supporting member comprising an apertured bracket fixedly secured to said supporting member, a rod having one end swingably connected to said frame and having the other end slidably mounted in a bracket aperture, regulator means adjustable to different positions along said other end of said rod, a first spring means associated with said other end of said rod in abutting relation with said regulator means and said bracket to support the weight of said topping unit as said topping unit is swung downward about said frame, a retainer plate slidably mounted adjacent said one end of said rod, a second spring means associated with said one end of said rod in abutting relation with said bracket and said retainer plate, means for adjusting the initial compression of said second spring means, means associated with said one end of said rod engageable with said retainer plate after a predetermined upward swinging movement of said topping unit to limit the movement of said retainer plate with respect to said rod to thereby control the upward swinging movement of said topping unit by placing said second spring means in compression, said means for adjusting the initial compression of said second spring means including a second rod having one end slidably mounted in a bracket aperture, stop means on said one end of said second rod engageable with said bracket, the other end of said second rod being slidably mounted with respect to said retainer plate, and means for selectively locking said retainer plate with respect to said second rod in one of a plurality of positions to thereby adjust the initial compression of said second spring means.

3. For use with a beet topper or the like including a frame and a top cutter supporting member swingably mounted on the frame for movement in a vertical plane, a stabilizing unit adapted to resiliently support and control the movement of said member, comprising a first rod mounted on said frame for swinging movement in the plane of said member, first and second spring means mounted on said rod in end to end relation, first and second adjustable regulator means engageable with the outer ends of said springs to control the compression thereof, said first adjustable regulator means being slidably mounted on said rod, a bracket fixedly secured to said member and slidably receiving said rod, said bracket being positioned between said spring means and having said first adjustable regulator means operatively associated therewith, said bracket forcing said second spring against said second adjustable regulator means to support the weight of said member as said member is swung in one direction, and control means on said rod engageable with said first adjustable regulator means, said bracket forcing said first adjustable regulator means against said control means after a predetermined swinging movement of said member in the other direction to compress said first spring means and to thereby limit the swinging movement of said member in that direction, said first adjustable regulator means comprising an apertured retainer plate slidably mounted on said rod and adapted to engage the outer end of said first spring means, a second rod having one end adjustably mounted in a retainer plate aperture and the other end slidably mounted in a bracket aperture, means engageable with said one end of said second rod for locking said retainer plate with respect to said rod, and means engageable with the other end of said second rod restricting the sliding movement of said second rod in one direction with respect to said bracket.

References Cited in the file of this patent

UNITED STATES PATENTS 3,059,399  Oppel ---------------- Oct. 23, 1962

FOREIGN PATENTS 206,682  Austria ---------------- Dec. 10, 1959